Oct. 25, 1932.   H. F. OLSON   1,885,001
APPARATUS FOR CONVERTING SOUND VIBRATIONS INTO ELECTRICAL VARIATIONS
Filed March 31, 1931   5 Sheets-Sheet 1

INVENTOR
HARRY F. OLSON
BY
ATTORNEY

Oct. 25, 1932.  H. F. OLSON  1,885,001
APPARATUS FOR CONVERTING SOUND VIBRATIONS INTO ELECTRICAL VARIATIONS
Filed March 31, 1931   5 Sheets-Sheet 3

INVENTOR
HARRY F. OLSON
BY
ATTORNEY

Oct. 25, 1932.  H. F. OLSON  1,885,001
APPARATUS FOR CONVERTING SOUND VIBRATIONS INTO ELECTRICAL VARIATIONS
Filed March 31, 1931   5 Sheets-Sheet 4

INVENTOR
HARRY F. OLSON
BY
ATTORNEY

Oct. 25, 1932.   H. F. OLSON   1,885,001
APPARATUS FOR CONVERTING SOUND VIBRATIONS INTO ELECTRICAL VARIATIONS
Filed March 31, 1931   5 Sheets-Sheet 5

INVENTOR
HARRY F. OLSON
BY
ATTORNEY

Patented Oct. 25, 1932

1,885,001

UNITED STATES PATENT OFFICE

HARRY F. OLSON, OF BRONX, NEW YORK, ASSIGNOR TO RADIO CORPORATION OF AMERICA, A CORPORATION OF DELAWARE

APPARATUS FOR CONVERTING SOUND VIBRATIONS INTO ELECTRICAL VARIATIONS

Application filed March 31, 1931. Serial No. 526,598.

This invention relates to apparatus for converting sound vibrations into electrical variations. More particularly it relates to apparatus of this nature in which the means for converting the sound vibrations into electrical variations consists of a relatively small body supported and arranged so that its motion is analogous to the motion of a particle in free air. The displacement of a body supported and arranged in this manner will be at any instant, proportional to the displacement of a particle set in motion in free air by the sound wave. Apparatus of this nature may be designated generally as a velocity microphone.

The apparatus consists fundamentally of a relatively small-mass body adapted for movement by sound wave pressures, and means for converting the movement of the body into electrical variations. The body is supported in a manner such that it is substantially under the control solely of the sound waves. That is, the body has only a small force exerted on it by means other than the sound waves. In a preferred modification the body has a form of a ribbon.

In accordance with an important object of the invention the body or ribbon is arranged and supported so that it is subjected on both sides thereof to pressure variations due to the sound waves. As a result of the small mass and small restoring force of the ribbon, and the manner of supporting it and subjecting it to sound wave pressures on opposite sides thereof, the motion of the ribbon throughout the audible frequency range will be proportional to the motion of a particle in free air.

Another important object of the invention is to associate a baffle with the ribbon to obtain a sound wave path of predetermined length between the opposite sides of the ribbon. The baffle dimensions are preferably such that the sound wave path is equal substantially to half the wave length of the highest frequency sound wave to be converted into electrical variations. When a ribbon-like body having a small mass and a small restoring force is provided with a baffle as described, the difference between the sound wave pressures at the opposite sides of the ribbon is determined by the dimensions of the baffle. At any instant the pressure at each side of the baffled ribbon is determined by the pressure corresponding to the phase of the sound wave at that point. The phase difference between the points at each side of the ribbon is equal to the length of the sound wave path around the baffle. When the baffle dimensions are such that the length of the sound wave path between the opposite sides of the ribbon is equal to a half wave length, the difference between the pressures at the opposite sides of the ribbon is a maximum at that frequency.

A further object of the invention is to combine a baffle of such dimensions that it will not cause an appreciable sound wave shadow at any frequency within the desired audible frequency range, with a small, light, mass-controlled body of the type described.

A still further object of the invention is to design and arrange the parts so that the apparatus will be highly directional at all frequencies within the audible spectrum.

Other objects of the invention will become apparent upon reading the following specification in connection with the accompanying drawings in which.

Figure 1:
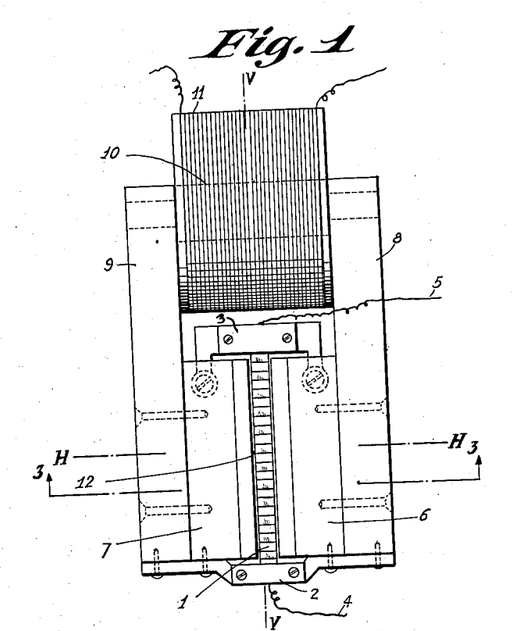
Fig. 1 is a front view of an approved form of the apparatus embodying the invention.
Figure 2:
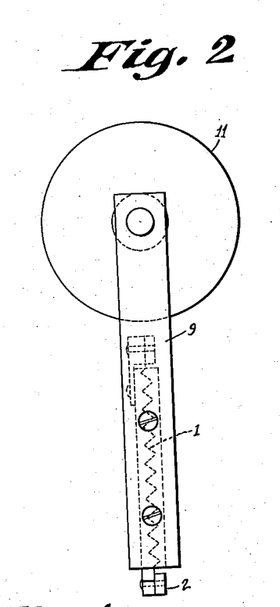
Fig. 2 is a side view of the apparatus illustrated in Fig. 1.

Referring to the drawings in which like parts are indicated by the same reference character, and to Fig. 1 particularly, 1 indicates a body which is adapted to move in response to pressure variations at opposite sides thereof due to sound waves. The body 1 is designed to have a relatively small mass and in this modification it consists of an elongated-ribbon-like member of conducting material. The ribbon is made from suitable, thin flexible material of relatively low elasticity, such as for example, aluminum foil, and it is preferably crimped, as shown, in order that it may be very flexible throughout its length. The limp, crimped ribbon is supported at its ends by suitable supporting means 2 and 3.

Supporting members 2 and 3 may be of any suitable design and arrangement. They may be connected to any suitable parts of the structure of the apparatus by any means such as cap screws or pins. In a satisfactory arrangement the supporting members are made in two parts, both parts being of non-ferromagnetic conducting material. One part is larger than the other and is fastened to adjacent structure. Suitable insulating material is placed between the part and the structure to which it is secured. In another arrangement, one part is made of insulating material and the other part is made of non-ferromagnetic conducting material. The part of insulating material is fastened to the adjacent structure of the apparatus and the part of conducting material is fastened to the part of insulating material so that it will be insulated from the other structure. In both instances the ends of the ribbon are clamped between the two parts.

Leads 4 and 5 are connected to the ends of the ribbon. When the supporting members 2 and 3 are each made in two parts, one at least of which is of conducting material, the leads may be electrically connected with the ends of the ribbon by means of the conducting parts.

The ribbon is held at its ends by the supporting members 2 and 3 in a manner such that it is not under any material tension. The lack of material tension in supporting the ribbon, and its limpness due to its natural flexible nature, cause it to have only a small restoring force. The small restoring force and slight mass of the ribbon cause its natural period of vibration to be below the audible frequency range. It has been found that very desirable results can be obtained when the natural period of the ribbon is around ten cycles per second. When a diaphragm of small mass is suspended in this manner its mechanical reactance is small compared to the impedance of the air. In other words its mass reactance is negligible over a large frequency range compared to the acoustic resistance of the air which it displaces.

The ribbon 1 is positioned between two pole pieces 6 and 7 which are secured to suitable ferro-magnetic members or arms 8 and 9 in any manner. The pole pieces 6 and 7, the ferro-magnetic members 8 and 9, and a connecting member 10 form a magnetic circuit which is completed through the air gap between the pole pieces. The magnetic circuit may be in the form of a permanent magnet which does not require additional energizing means, or it may be provided with a suitable winding 11 for supplying the desired magnetic flux. The winding 11 may be positioned around the connecting member 10, as shown, or it may be around either of the members 8 and 9 or both of them.

The pole pieces 6 and 7 are spaced from each other so as to form an elongated air gap 12 across which there is a strong magnetic field. The ribbon 1 is disposed and arranged in the magnetic field between the pole pieces so that its surfaces are parallel with the lines of force. Its edges are spaced from the inner edges of the pole pieces just sufficiently to prevent frictional contact between the ribbon and the pole pieces. It is desirable that the air spaces between the edges of the ribbon and the pole pieces be made as small as possible so that there will be substantially no leakage of air around the edges of the ribbon. It has been found that an air gap substantially $\frac{1}{32}$ of an inch in width and a ribbon slightly smaller will give very good results.

As the ribbon moves in the air gap 12 due to the pressure variations at the opposite sides thereof, it cuts the lines of force in the magnetic field. This sets up an electromotive force in the ribbon which is proportional to the movement of the ribbon. The electromotive force is applied by means of the conductors 4 and 5 connected to the ends of the ribbon, to suitable apparatus, such as an amplifier (not shown).

The pole pieces 6 and 7 and the arms 8 and 9 form a baffle which increases the length of the sound wave path between the opposite sides of the ribbon. The length of this path controls the response of the apparatus, as will be pointed out hereinafter. At the ends of the ribbon the paths between the opposite sides thereof, which go around the supporting members 2 and 3 are not as long as the paths around the pole pieces and arms 8 and 9. These shorter paths at the lower end of the ribbon have some affect on the response of the apparatus but it is relatively small due to the fact that they provide shorter paths for only a relatively small portion of the ribbon. At the upper end of the ribbon the shorter paths are so restricted that they have a high impedance to the passage of the sound wave therethrough. As a result the shorter paths at the upper end of the ribbon do not materially affect the response of the apparatus.

The ribbon has been described as being of flexible material made sufficiently thin to be limp and to have a small mass. It is generally sufficient to make the ribbon relatively light but in some instances it is desirable to vary the thickness of the ribbon to obtain maximum efficiency with baffles of different sizes. Maximum sensitivity can be obtained by varying the thickness of the ribbon so as to make its resistance as low as possible while, at the same time, keeping its mass reactance of the same order of magnitude as the loading reactance due to the air. Different size baffles are used for special purposes in which microphones of limited frequency range are desired.

Figure 3:
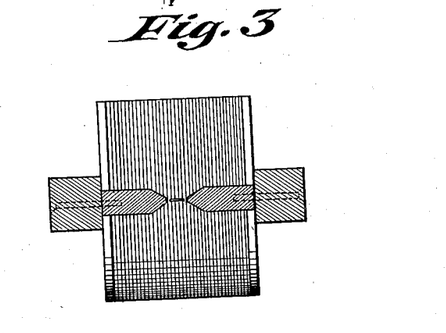
Fig. 3 is a sectional view taken on the line 3—3 of Fig. 1.
Figure 4:
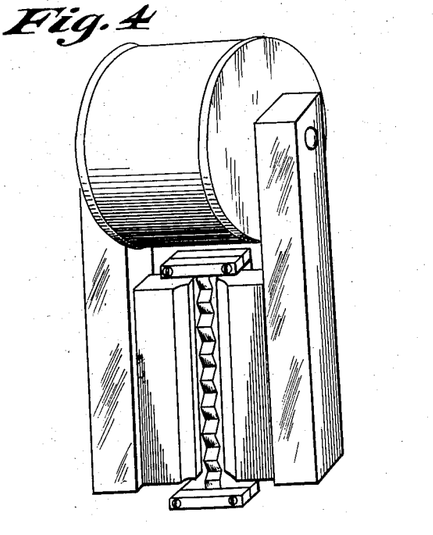
Fig. 4 is an isometric view of an apparatus substantially as illustrated in Fig. 1.

In the isometric view illustrated in Fig. 4 the supporting members are slightly different in shape from the supporting members 2 and 3 shown in Figs. 1 and 3. Otherwise the structure is the same. At least one of these supporting members is preferably made of conducting material but both members should be made of non-magnetic material such as, for example, copper or brass.

Figures 5, 7, 8:
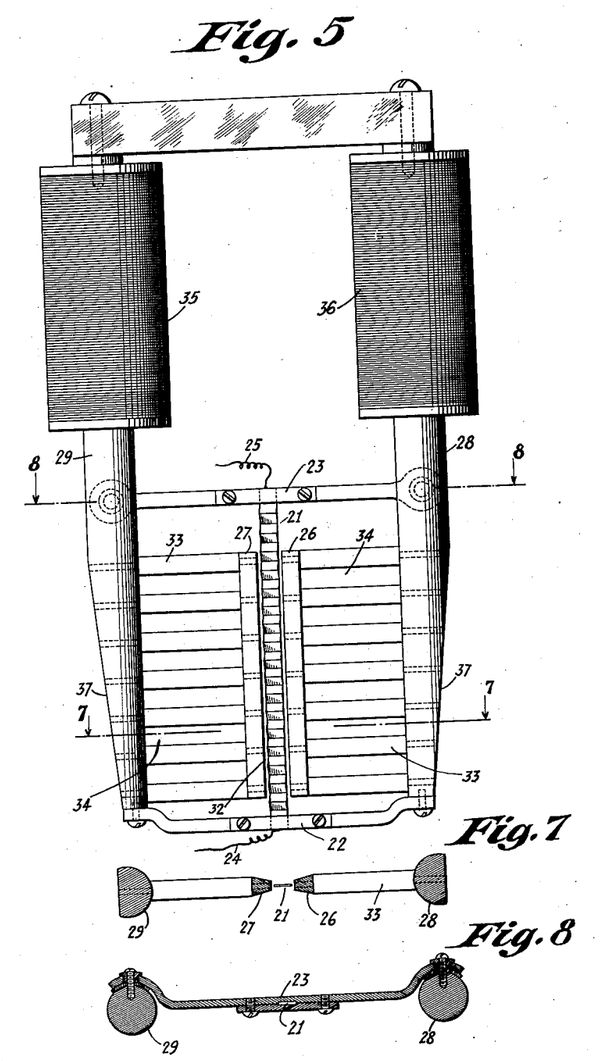
Fig. 5 is a front view of a modified form of the apparatus embodying the invention.
Fig. 7 is a sectional view taken on line 7—7 of Fig. 5.
Fig. 8 is a sectional view taken on line 8—8 of Fig. 5.
Figure 6:
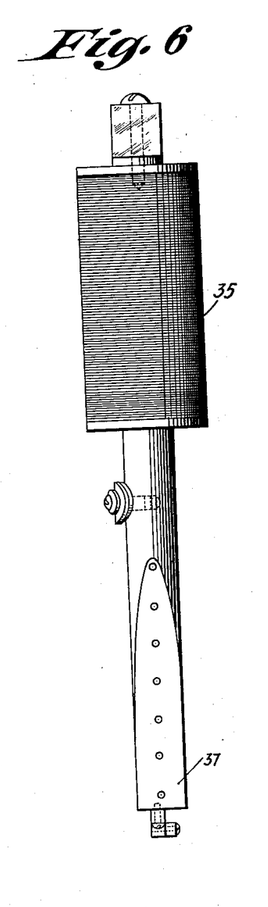
Fig. 6 is a side view of the modification illustrated in Fig. 5.

Fig. 5 is a modification of the apparatus illustrated in Fig. 1. In this modification also the sound-pressure responsive body is in the form of a crimped, limp, ribbon-like member 21. The ribbon is positioned in the air gap 32 between the pole pieces 26 and 27. The pole pieces are magnetically connected with but physically spaced from the arms 28 and 29 by means of small ferro-magnetic rods 33. The rods 33 are separate from each other so as to leave openings 34 forming air paths which provide communication between the opposite sides of the ribbon 21. The ribbon is constructed the same as in the previous modification. It is supported by suitable supporting members 22 and 23. Leads 24 and 25 are connected with the ends of the ribbon. The magnet system is energized in this modification by means of two windings 35 and 36 which surround the arms 29 and 28 respectively.

The pole pieces 26 and 27 are somewhat smaller than pole pieces 6 and 7 of the modification illustrated by Fig. 1. Due to the smaller pole pieces and to the openings 34 between the rods 33 which space the pole pieces from the arms 28 and 29, the length of the air path between the two sides of the ribbon is considerably less than in the modification illustrated by Fig. 1.

Figure 9:
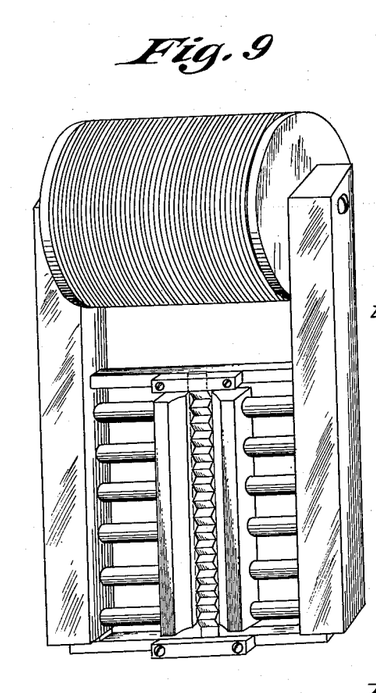
Fig. 9 is an isometric view of a modification similar to the modification illustrated in Fig. 5.

The arms 28 and 29 are cut away slightly toward their lower ends as shown at 37 in order to reduce to a minimum the material tending to block or distort the sound wave. The pole pieces 26 and 27 have their sides converging toward the air gap 32 in order to increase the flux density therein. It is not essential however, that the arms 28 and 29 be cut away at their lower ends or that the pole pieces be formed with converging sides. In Fig. 9 a modification of Fig. 5 is shown in which the arms are not cut away at their lower ends. In this figure only a single winding is used to provide the magnetic flux, instead of the two windings 35 and 36 used in Fig. 5.

Figure 10:
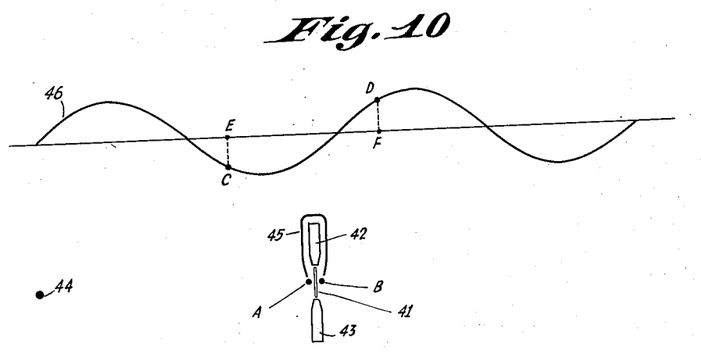
Fig. 10 is a diagrammatic representation of the apparatus and the manner in which it is affected by a sound wave.

Fig. 10 illustrates diagrammatically an apparatus of the type described and the manner in which it is affected by a sound wave. The ribbon is indicated at 41 and the baffles formed by the pole pieces are indicated at 42 and 43. The diagrammatic illustration may be considered either an end view or a sectional view of Fig. 1.

When the apparatus is affected by a sound wave from a source, such as, for example, point 44 perpendicularly in front of the ribbon, the action is substantially as follows: The sound wave in traveling through the air sets up an instantaneous pressure at point A at one side of the ribbon, and a different instantaneous pressure at point B at the other side of the ribbon. The ribbon moves back and forth (toward the right and left as viewed in Fig. 10) in response to the differences in pressure at its opposite sides. The instantaneous pressure at point A which is the side of the ribbon towards the source, depends directly upon the sound wave. The instantaneous pressure at point B depends not only upon the sound wave but also upon the length of the sound wave path around the baffle between points A and B. The path is indicated by the line 45.

It has been found that when a body is subjected at opposite sides to sound wave pressure, the difference between the pressures at the two sides is equal substantially to the difference between the pressure at two points on the sound wave, which are spaced from each other a distance equal to the length of the sound wave path between the opposite sides of the body. In other words, the pressures at the two sides of the body are determined by the phase of the sound wave at the two sides of the body. The phase of the sound wave at the back of the body differs from the phase of the sound wave at the front of the body by an amount equal to the length of the sound wave path between the two sides of the body.

For example, in Fig. 10, if the sound wave from the source 44 is indicated diagrammatically by the line 46, two points C and D can be set off on the line where the sound wave pressures will correspond to the sound wave pressures at points A and B. Points C and D will be spaced along the sound wave at a distance E—F equal to the length of the path 45 between points A and B. The sound wave pressure at point C will be equal to the vertical distance C—E and the sound wave pressure at point D will be equal to the vertical distance D—F. The total pressure difference between points C and D will be equal to the sum of C—E plus D—F.

The maximum difference in sound pressure between points A and B occurs when points C and D are at the uppermost and lowermost points on the sound wave, or vice versa. This can take place only when the frequency of the sound wave is such that points E and F are a half wave length apart. Thus the maximum pressure difference occurs when the length of the path 45 is equal to a half wave length.

It does not follow, however, that the minimum pressure difference occurs when the frequency of the sound wave is such that the distance E—F is equal to a wave length. Nor is there a maximum pressure difference every time the distance E—F is equal to an odd number of half wave lengths, and a minimum pressure difference every time the distance E—F is equal to an even number of half wave lengths.

The intensity of the sound at the two sides of the baffle is practically the same for all wave lengths greater than twice the distance 45 (Fig. 10). Above the frequency where the wave length is equal to twice the distance 45, the intensity at the front side increases and the intensity at the back side decreases. Where the wave length becomes equal to or greater than the size of the baffle or the distance 45, the intensity at the face of the baffle becomes four times that in free space and the intensity at the back side zero. Or in terms of pressure, the pressure at the face is two times that in free space and the pressure at the back zero. From this it follows that the difference in pressure between the two sides of the baffle is proportional to the frequency until the distance from front to back is a half wave length. At this frequency the difference in pressure between the two sides is twice that in free space. Above this frequency the difference in pressure between the two sides no longer increases but remains twice that in free space.

The velocity of a mechanical body is determined by the ratio of the applied force and mechanical impedance, that is—

$$\frac{dx}{dt} = \frac{p}{z} \text{ where } \frac{dx}{dt}$$

is the velocity and $p$ the pressure and $z$ the mechanical impedance. In the case of a mass controlled body the impedance is proportional to the frequency. Now in this microphone provided the wave length of the highest frequency to be reproduced is twice the distance 45, the difference in pressure between the two sides will be proportional to the frequency. From the above equation the velocity $$\frac{dx}{dt}$$

of the element will be independent of the frequency. If the element is located in a magnetic field the generated voltage will be independent of the frequency.

In the modification disclosed in Fig. 1 pole pieces 6 and 7 and arms 8 and 9 are designed so as to provide a sound wave path between the opposite sides of the ribbon, substantially equal in length to a half wave length at a frequency of 6,000 cycles. The approximate length of the path from one side of the ribbon around either one of the pole pieces and its associated arm, to the other side of the ribbon is 3½ cms. This apparatus will have a fairly uniform and high response up to around 6,000 cycles. Above that frequency the response will fall off gradually. A microphone of this type is well adapted for work where it is not desired to reproduce or record sounds having a frequency higher than 6,000 cycles.

Where it is desired to reproduce or record sounds of higher frequency than 6,000 cycles, the modification illustrated by Fig. 5 is used. In this modification the pole pieces 26 and 27 are made small and spaced from arms 28 and 29 by rods separated from each other to provide short air paths between opposite sides of the ribbon. These air paths are somewhat shorter than the corresponding paths in Fig. 1 and therefore the apparatus disclosed in Fig. 5 will reproduce higher frequencies than the apparatus disclosed in Fig. 1. In Fig. 5 the length of the path between the opposite sides of the ribbon is made about $1\frac{8}{10}$ cms. and as a result the apparatus will respond uniformly up to about 10,000 cycles. Above that frequency the response will fall off gradually.

Figure 11:
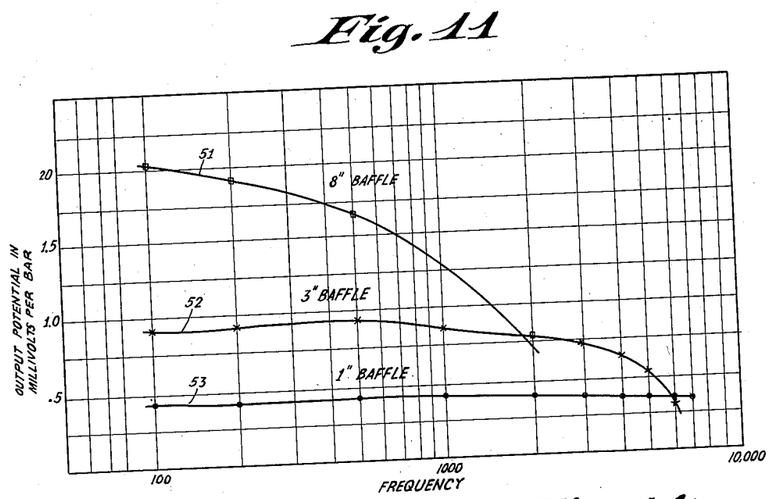
Fig. 11 is a diagram showing response characteristics of the apparatus with different size baffles.

Fig. 11 is a chart showing the response characteristics when different size baffles are used. The abscissæ represent the frequency of the sound waves and the ordinates represent in milivolts per bar, the potential of the output of the apparatus. Curve 51 is the characteristic of the microphone when an eight inch baffle is used. Curve 52 is the characteristic when a three inch baffle is used. Curve 53 is the characteristic when a one inch baffle is used.

It will be seen from Fig. 11 that there is a greater response when an eight inch baffle is used but the apparatus starts to cut off in the neighborhood of 1,000 cycles. It is evident that an eight inch baffle could be used only in very special instances where it would be desired only to record or reproduce the very low frequencies. When a three inch baffle is used (curve 52) the response is fairly uniform from a very low frequency up to the neighborhood of 6,000 cycles per second, at which point it starts to fall off gradually. In case of a one inch baffle (curve 53) the response is somewhat lower but it is fairly uniform up to about 10,000 cycles. It is only necessary to determine the frequency range over which the microphone is to be used and then to design the baffle so as to give the maximum response up to the desired upper frequency limit, and above this point a gradual decrease in output.

It has also been found that a body subjected on opposite sides to sound wave pressures as described, and kept free from air chambers which would cause substantial air loading, is highly directional. If a sound wave is from a source at right angles to the plane of the ribbon, i. e., the plane of the apparatus itself, the sound wave will have a maximum effect on the ribbon. But when the sound wave is from a source in the plane of the ribbon it has no effect on the ribbon as the instantaneous sound wave pressures at the opposite sides of the ribbon are equal. When the source of sound is at an intermediate point, i. e., a point between the plane of the ribbon and the perpendicular to the ribbon, its effect is equal to the effect when the source is perpendicular to the ribbon, times the cosine of the angle between the perpendicular and the line from the source to the ribbon.

Figure 12:
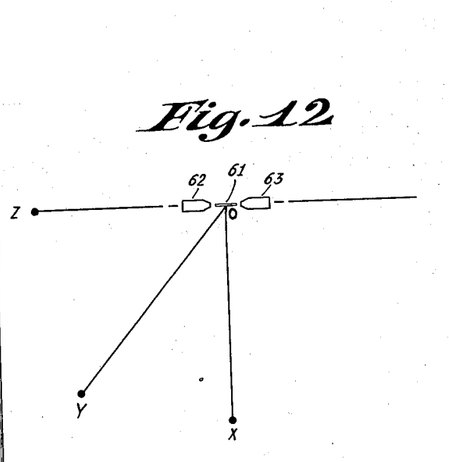
Fig. 12 is a second diagrammatic representation of the apparatus.

Referring to Fig. 12, reference numerals 61, 62 and 63 indicate diagrammatic representations of cross sections of the ribbon and the baffles. X is a point perpendicular to the plane of the ribbon, Z is a point in the plane of the ribbon and Y is an intermediate point. When the source of sound is at X the difference between the sound wave pressures at the opposite sides of the ribbon depends upon the length of the path around baffle 62 or baffle 63. In Fig. 10 this was indicated on the sound wave curve as the distance between points E—F. When the source of sound has moved to point Y the difference in pressure is equal to the pressure difference at point X, times the cosine of angle XOY. As the cosine is always less than one, except when the angle is 0°, the difference in pressure when the source is at point Y is always less than the difference in pressure when the source is at X. When the source has moved to point Z which is in the plane of the ribbon, the angle XOZ is equal to 90°. The cosine of 90° is equal to 0 therefore, the difference in pressure is likewise equal to zero. Thus the ribbon is not affected when the source of sound is in the plane of the ribbon.

Figure 13:
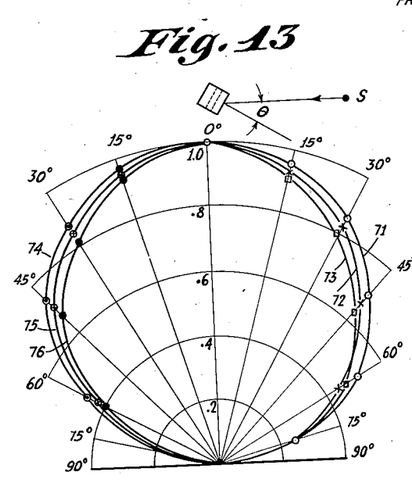
Figs. 13 and 14 are polar diagrams showing the directional properties of the apparatus.
Figure 14:
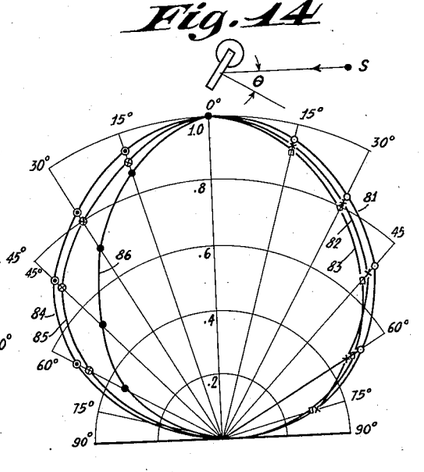

The directional properties of the microphone do not vary with frequency variations. This is shown by the polar diagrams Figs. 13 and 14. Fig. 13 is a polar diagram of the response when the microphone is rotated about its vertical axis V—V, Fig. 1. Fig. 14 is a similar diagram when the microphone is rotated about its horizontal axis H—H, Fig. 1.

In Fig. 13 the vertical line indicates the response at 0°, that is, when the source of sound S is perpendicularly in front of the ribbon. As the microphone is rotated so that the source of sound S forms varying angles of $\theta$ with the line perpendicular to the ribbon, readings at 15°, 30°, 45°, 60°, 75° and 90° give the curves shown. On the right hand side of the diagram, curve 71 is for a frequency of 1,000 cycles, curve 72 is for a frequency of 500 cycles, and curve 73 is for a frequency of 100 cycles. On the left hand side of the diagram, curve 74 is for a frequency of 2,000 cycles, curve 75 is for a frequency of 3,000 cycles, and curve 76 is for a frequency of 5,000 cycles. Half of the curves have been placed on the right hand side of the diagram and half on the left hand side merely because the curves are so close together. If the curves are completed, in any instance, they will be the same on both sides of the diagram.

In Fig. 14 the curves are obtained in the same way. In this figure curves 81, 82 and 83 are for frequencies of 1,000 cycles, 500 cycles and 100 cycles respectively. Curves 84, 85 and 86 are for frequencies of 2,000, 3,000 and 5,000 cycles respectively. Curve 86 is slightly different from the other curves but this is due to the foreshortening of the ribbon which results from the particular way the microphone is rotated.

Figs. 13 and 14 show that the sound waves have a maximum effect on the microphone when the source of sound is perpendicularly in front of the ribbon. When the source of sound is moved so that it forms an angle of 30° with the perpendicular, the effect of the sound waves is approximately 80% of their maximum effect. When the source of sound forms an angle of 45° with the perpendicular, the effect of the sound waves is reduced to approximately 70% of their maximum effect. At 60° the effect is reduced to approximately 50% and at 75° the effect is reduced to approximately 25%. At 90°, i. e., when the source of sound is in the plane of the ribbon, the effect of the sound waves is reduced to zero.

In the apparatus hereinbefore described reference has been made to a ribbon-like body. It is not necessary however, that the body vibrated by the sound wave pressure be in the form of a ribbon. Any small, light body suspended so that it does not have a material restoring force, i. e. a body which is mass controlled in an acoustic sense as compared to stiffness controlled, can be used. It is necessary, however, that the means for converting the motion of the body into electrical variations be arranged so that both sides of the body are freely subjected to the sound wave pressure. It is also necessary that the baffle formed by the supporting means for the body and/or the means for converting the motion of the body into electrical variations, be sufficiently small so that the sound wave path between the opposite sides of the body is not greater than a half wave length of the highest frequency note to be reproduced or recorded.

Figure 15:
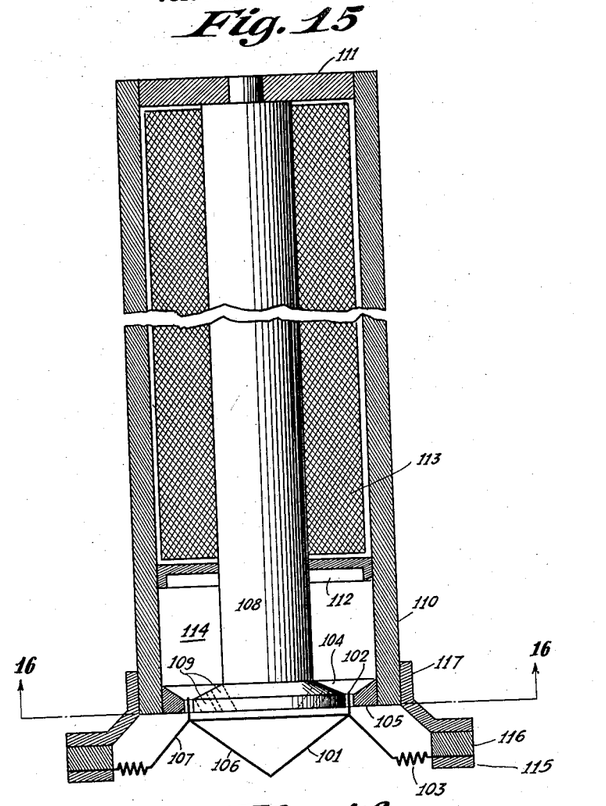
Fig. 15 is a sectional view of a modified form of the apparatus in which a different shaped diaphragm has a current carrying coil connected thereto.

Fig. 15 illustrates a modification of the invention in which a body, not ribbon-like in shape, is used. In this modification, a small diaphragm 101 having a coil or conductor 102 connected therewith is supported by flexible supporting means 103, so that the coil or conductor 102 is in the magnetic field between a central pole piece 104 and an outer pole piece 105. The diaphragm is relatively small and light being made preferably from heavy paper, aluminum or some similar substance. In the modification shown it has a central conical portion 106 and an outer frustum shaped portion 107. The coil or conductor 102 is preferably connected to the diaphragm at the junction of the conical and frustum portions but it may be connected to any other part of the diaphragm. The supporting material 103 may be an annular rim of flexible material such as cloth, skin or any membraneous material having a low restoring force. It may also be made from a material such as paper which is crimped to make it more flexible. The coil or conductor 102 may be fastened to the diaphragm in any suitable manner either directly or by means of a small cylinder. In a preferred modification a cylinder of non-conducting material is secured to the diaphragm in any manner and a coil is wound on the cylinder.

The central pole piece 104 preferably consists of an enlarged head on the cylindrical member 108. The pole piece 104 may be formed directly on the member 108 or it may be a separate piece secured thereto by any suitable means. The outer pole piece 105 consists of an annular member which preferably decreases in thickness in the direction of the air gap. The pole pieces 104 and 105 are spaced from each other a sufficient distance to permit the coil or conductor 102 to move freely in the air gap formed between the pole pieces. The central pole piece 104 is provided with a plurality of borings 109 which are provided so that the inner surface of the conical portion 106 of the diaphragm is subjected to the pressure of the sound waves.

Pole piece 105 is connected with the cylindrical member 108 by means of four strips 110, and a disc-like member 111. The disc-like member 111 is fastened to the cylindrical member 108 at the opposite end from the pole piece 104. The peripheral dimensions of the member 111 are the same as the outer dimensions of pole piece 105. The member 111 and the pole piece 105 are provided at their peripheries with four flat surfaces against which the four strips 110 are positioned. The strips are fastened to member 111 and pole pieces 105 in any suitable manner. The member 111 and the strips 110 are made of suitable magnetic material such as soft iron or an iron alloy. The space is maintained between the pole pieces 104 and 105 by means of a spacing washer 112 which fits around the cylindrical member 108 and engages the inner surface of the strips 110. The pole pieces 104 and 105 are energized by means of a winding 113 surrounding the cylindrical member 108. The winding is adapted to be connected to a source of direct current.

The spacing washer 112 is positioned sufficiently far from the pole pieces 104 and 105 to provide a space 114, for comparatively free circulation of the sound wave. Thus the sound wave which affects the front of the central conical portion 106 of the diaphragm is permitted to circulate freely in the space 114 and to likewise affect the rear surface of the conical portion 106 by means of the borings 109 in the pole pieces 104. The length of the sound wave path between the front and rear sides of the conical portion 106 is determined by the dimensions of the diaphragm, the diaphragm supporting structure and the pole piece 104. The dimensions and number of the borings 109 also determine to a slight extent the effective length of the sound wave path between the front and rear sides of the conical portion 106, for the reason that the borings tend to increase the impedance of the path. If a large number of relatively large borings are provided, the effective sound wave path is substantially unimpeded. In a preferred modification there are 16 borings and they are made as large as possible without reducing the amount of material in pole piece 104 beyond the point where it would have an effect on the flux density in the air gap between the pole pieces.

Figure 16:
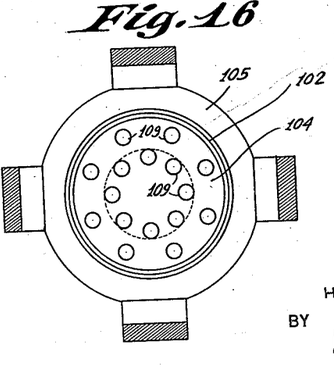
Fig. 16 is a sectional view taken on line 16—16 of Fig. 15.

The flexible supporting member 103 is preferably connected to the periphery of the frustum shaped portion 107 of the diaphragm. The outer edge of the flexible supporting member is clamped between two clamping rings 115 and 116. These clamping rings are supported by four brackets 117. The supporting brackets 117 are connected to the four strips 110 and to the supporting ring 116 in any suitable manner. The length of the sound wave path from the front to the rear of the frustum shaped portion 107 of the diaphragm is determined by the dimensions of the supporting member 103 and the supporting rings 115 and 116. As the supporting brackets 117 are relatively small they do not have an effect on the sound wave. The operation of the modification disclosed in Figs. 15 and 16 substantially the same as the operation of the modifications heretofore described.

In the foregoing specification several approved modifications of the invention have been disclosed and described. It is to be understood, however, that it is not intended to limit the invention to the modifications shown, as various other arrangements can be made without departing from the spirit of the invention. It is intended that the invention should be limited only by the scope of the appended claims. It is to be understood that various substitutions may be made which will come within the range of equivalents.

I claim:

1. Apparatus for converting sound vibrations into electrical variations comprising a body subjected at opposite sides thereof to pressure variations due to a sound wave, said body being adapted to move in response to said pressure variations, means for supporting the body, means for converting the movement of said body into electrical variations, and means forming a baffle to provide a sound wave path between the opposite sides of said body equal substantially to half the wave length of the highest frequency sound wave to be converted into electrical variations.

2. Apparatus for converting sound vibrations into electrical variations comprising a body subjected at opposite sides thereof to pressure variations due to a sound wave, means for supporting said body for movement by said pressure variations, said supporting means providing substantially no additional force to said body, means for converting the movement of said body into electrical variations, and means for forming a baffle to provide a sound wave path between the two sides of said body the length of which is not substantially greater than half a wave length of a sound wave having a frequency of approximately 6,000 cycles.

3. Apparatus for converting sound vibrations into electrical variations comprising a body subjected at opposite sides thereof to pressure variations due to a sound wave, said body being adapted to move in response to said pressure variations, means for supporting said body for movement so that it is mass controlled in an acoustic sense over the desired audible frequency range, means for converting the movement of said body into electrical variations, and means adjacent said body constituting a baffle of such dimensions that it will not form an appreciable sound wave shadow at any frequency within the desired audible frequency range.

4. Apparatus for converting sound vibrations into electrical variations comprising a body subjected on opposite sides thereof to pressure variations due to a sound wave, means for supporting said body, said body being adapted for movement in response to said pressure variations, means for converting the movement of said body into electrical variations, means constituting a baffle to increase the length of the sound wave path between the opposite sides of said body, the last mentioned means consisting solely of pole pieces and ferro-magnetic arms connected thereto, and means positioned to one side of said body and pole pieces for setting up a magnetic field in said arms and pole pieces.

5. Apparatus for converting sound vibrations into electrical variations comprising a crimped elongated body subjected at opposite sides thereof to pressure variations due to sound waves, means for supporting said body, said body being arranged for movement in response to said pressure variations, means including a magnetic field for converting the movement of said body into electrical variations, baffle means adjacent the sides of said elongated body, and means for providing said magnetic field positioned to one end of said elongated body.

6. Apparatus for converting sound into electrical variations comprising a body adapted to be subjected at opposite sides thereof to pressure variations due to sound waves, said body being adapted to move in response to said pressure variations, means including a magnetic field for converting movement of said body into electrical energy, means positioned to one side only of said body for providing said magnetic field, the last mentioned means being spaced sufficiently far from said body to prevent interference with and distortion of the sound wave, and baffle means for providing a predetermined length sound wave path between the opposite sides of said body.

7. Apparatus for converting sound vibrations into electrical variations comprising a small, light body adapted to be subjected at opposite sides thereof to sound wave pressure variations, means for supporting said body so that it is substantially mass controlled in an acoustic sense over at least a desired portion of the audible frequency range, a baffle surrounding said body for providing a predetermined length sound wave path between the opposite sides of said body, and means for converting movement of said body into electrical variations, all parts of said means sufficiently large to disturb said baffle action being positioned to one side of said body and sufficiently far therefrom to prevent the sound wave pressures at the opposite sides of said body from being materially affected thereby.

8. Apparatus for converting sound vibrations into electrical variations comprising a ribbon-like body subjected at both sides thereof to pressure variations due to sound waves, means for supporting the ends of said ribbon-like body, means for converting movement of said body into electrical variations, said means including pole pieces positioned adjacent the edge of said ribbon-like body, and means for connecting said pole pieces in a magnetic circuit, the last mentioned means including members separated from each other so as to provide openings therebetween forming sound wave paths between opposite sides of the ribbon-like body.

9. An apparatus for converting sound vibrations into electrical variations comprising a ribbon-like body subjected at both sides thereof to sound wave pressures, means for converting movement of said body into electrical variations, said means including pole pieces adjacent the edges of said ribbon, arms of ferro-magnetic material spaced from said pole pieces, and a plurality of rods spaced from each other connected between said pole pieces and said arms.

10. A velocity microphone comprising a body adapted to be vibrated by instantaneous differences of sound wave pressure at opposite sides thereof, means for converting vibrations of said body into electrical variations, and structure surrounding portions of the edge of said body of such dimensions as to provide a sound wave path approximately equal to a half wave length of a sound wave having a frequency of 10,000 cycles per second.

HARRY F. OLSON.